Patented June 8, 1954

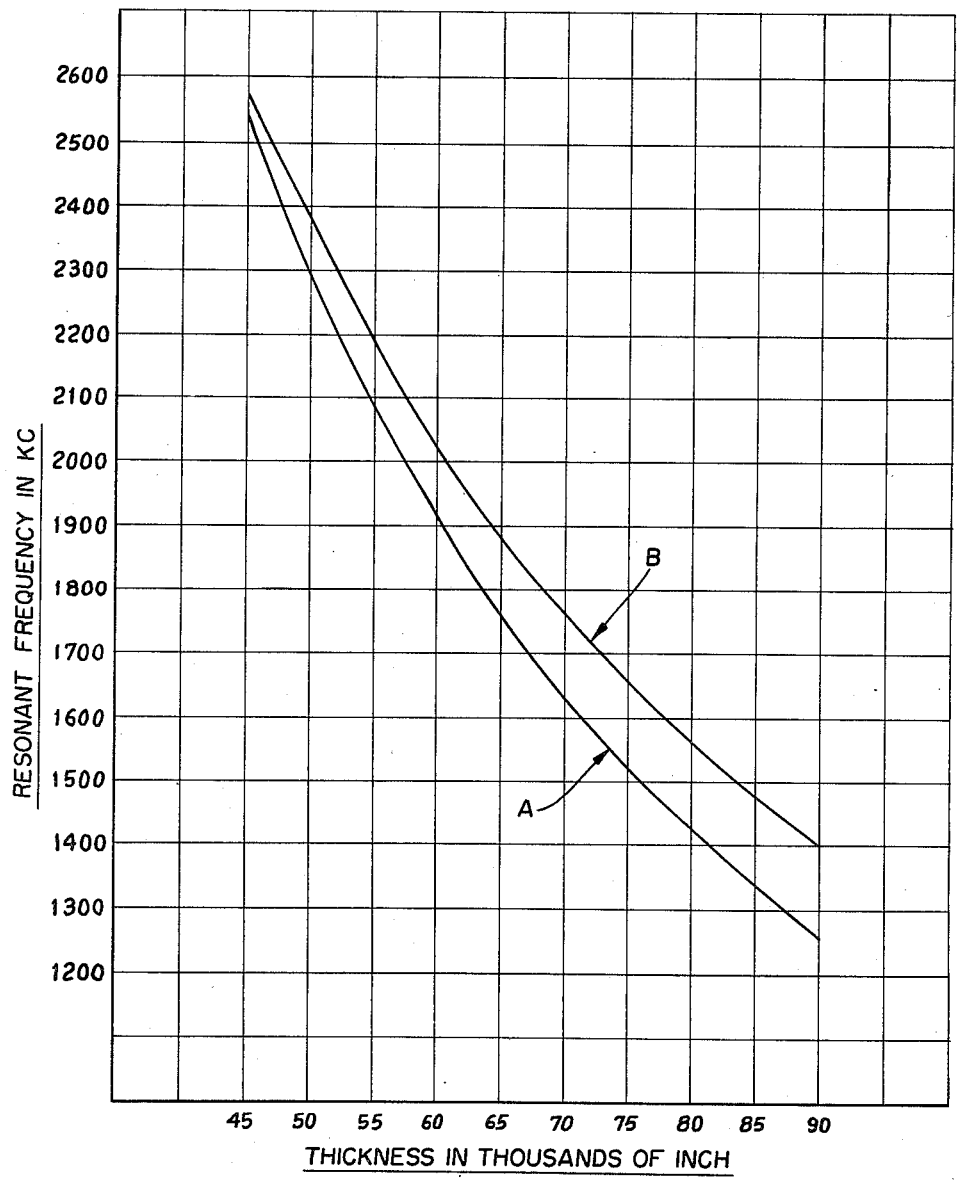

2,680,372

UNITED STATES PATENT OFFICE 2,680,372

ULTRASONIC TESTING DEVICE

Elliott A. Henry, Bridgeport, Conn., assignor to Sperry Products, Inc., Danbury, Conn., a corporation of New York Application May 17, 1951, Serial No. 226,865

2 Claims. (Cl. 73—67)

This invention relates to the transfer of ultrasonic energy into a work piece. More particularly the invention relates to devices such as disclosed in the patent to Rassweiler and Erwin No. 2,431,234 granted November 18, 1947, which devices have as their object to indicate the resonant frequency as a measure of the thickness of the work piece. The theory underlying these devices is that the thickness of the work piece is one-half the wave length at the resonant frequency, at which time maximum energy is supposed to be transferred into the work piece. This is the calculated resonant frequency.

In practice the actual frequency at which resonance is indicated has been found to differ from the calculated resonance frequency, and this deviation increased as the thickness of the work piece increased and the frequency of the applied energy decreased. Such deviation resulted in a diminution of sensitivity of energization because the apparent resonant frequency not being the true resonant frequency the maximum sensitivity of energization was not obtained.

It is therefore the principal object of this invention to provide means for insuring constant and maximum sensitivity of energization throughout the frequency range.

Further objects and advantages of this invention will become apparent in the following detailed description thereof.

In the accompanying drawings,

Fig. 2 is a graph illustrating the theory underlying this invention.

Figure 1:
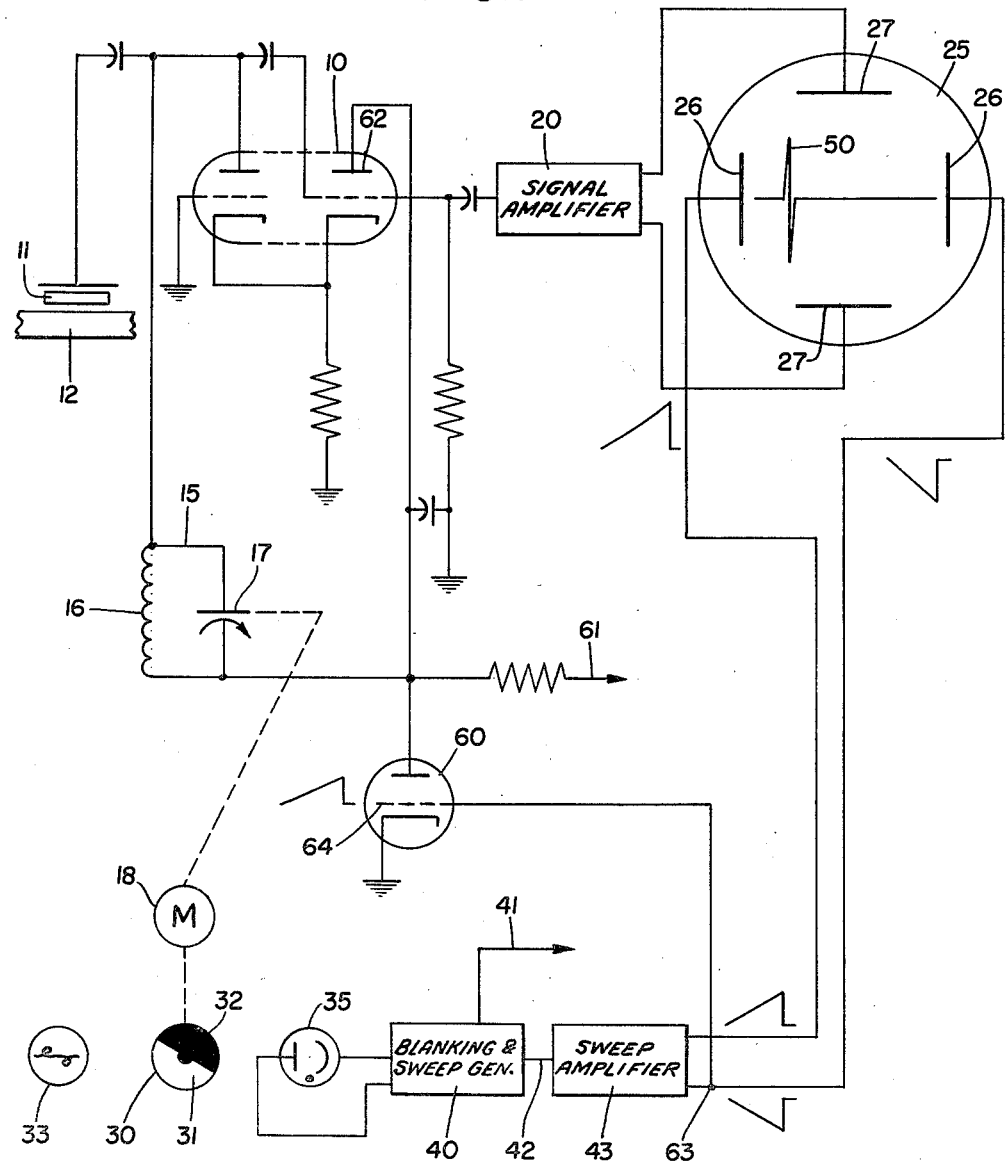
Fig. 1 is a wiring diagram embodying the invention.

Referring to Fig. 1, there is disclosed an oscillation generator 10 for energizing a piezo-electric element which may be in the form of a quartz crystal 11 which transforms the electrical oscillations into mechanical oscillations and transmits the mechanical oscillations to work piece 12. The oscillation generator 10 may comprise any known type of oscillator, that shown being known as a cathode driven oscillator of the type disclosed in U. S. Patent No. 2,269,417, granted January 6, 1942, to Murray G. Crosby. The oscillatory circuit includes a tank circuit 15 comprising an inductance 16 and a variable capacitor 17, the latter being designed to be continuously varied through a predetermined range by means of a motor 18. As the capacitance of capacitor 17 is varied the frequency of the circuit is varied. When a frequency is reached such that the thickness of the work piece equals one-half the wave length a resonant condition will exist at which time maximum power will theoretically be transferred into the work piece. At the resonance frequency maximum current will suddenly be drawn from the oscillatory circuit and this rapid change in current flow after being suitably amplified by a signal amplifier 20 may be indicated on any appropriate instrument, such as, for example, oscilloscope 25 having a sweep between horizontal plates 26, the signal being applied to vertical plates 27. In order to synchronize the sweep with the frequency range the motor 18 which drives capacitor 17 also drives a shutter 30 having a light-transmitting portion 31 and an opaque portion 32, designed to transmit and cut off light from a suitable source such as lamp 33 from a photoelectric tube 35. The shutter is so positioned as to pass light for the interval that the capacitor 17 is operating through the desired angular distance to provide the desired frequency range. During this interval the light will energize the photo-electric tube 35 to cause current to flow and energize a blanking and sweep generator 40 whose output 41 energizes the grid (not shown) of cathode ray tube (oscilloscope) 25 and whose output 42 after being amplified by a sweep amplifier 43 triggers the sweep on the oscilloscope. Thus the sweep is synchronized with the movement of the capacitor through the desired range of test frequencies. When resonance is apparently established a sharp indication such as 50 will appear on the screen and the position of this indication along the sweep is a function of the frequency and therefore may be an indication of the thickness of the work piece.

As hereinbefore stated, the calculated resonance frequency of any work piece 12 occurs when the thickness of the work piece is one-half of the wave length. Thus referring to Fig. 2, it will be seen that curve A indicates the calculated resonance frequencies for various thicknesses of work pieces. Thus for example for a steel work piece .080" thick the calculated resonance frequency would be 1430 kc. However in utilizing a device such as disclosed by Rassweiler and Erwin in their Patent No. 2,431,234 it has been found that the indicated resonance occurred at a substantially higher frequency. Thus for the steel work piece of .080" thickness the indicated resonance is 1585 kc., using a crystal having a natural frequency of approximately 2800 kc. for the indicated range in accordance with the teachings of Rassweiler and Erwin. The indicated resonance frequency thus deviates from the calculated resonance frequency by an excess 155 kc. From the two curves A and B it will be seen that as the thickness of a work piece increases the deviation between calculated resonance frequency and indicated resonance frequency increases. This deviation indicates that the capacitive reactance of the transducer has increased as the frequency of oscillation deviated from the natural frequency of the crystal because the capacitive reactance of the crystal increases with decrease in frequency when driven at a frequency lower than its natural frequency. Thus, if at the smaller thicknesses the resonance frequency of the work piece is close to the natural frequency of the crystal, there will be but a slight deviation as indicated in Fig. 2 for a work piece of .045" thickness. However as the thickness of the work piece increases and the resonance frequency decreases the crystal is operating further and further below its natural frequency and therefore there is increasing capacitive reactance of the crystal the further from its natural frequency that it is operated.

The load on the oscillator comprises the transducer and the work piece, and since this combination has a capacitive reactance, the oscillator tank circuit must have an inductive reactance equal in magnitude to the capacitive reactance of the load, in order to deliver maximum power. In order for the oscillator tank circuit to exhibit an inductive reactance it must be tuned to a higher frequency because of the capacitive reactance of the load. This accounts for the indicated resonance frequency being higher than the calculated resonance frequency of a test piece of given thickness. This deviation from calculated resonance frequency means that the theoretical maximum power is not being transferred into the work piece. The lower the frequency the greater the deviation and the greater the diminution of theoretical power transfer.

Under the above described conditions it is desirable to provide means for transmitting a signal that increases in amplitude as the frequency decreases in order to provide a substantially uniform sensitivity over the entire range of frequencies. For this purpose I have provided the following method. A tube 60 is normally conductive and permits power to flow from the high voltage source 61 which supplies power to the plate 62' of the oscillation generator. As long as tube 60 is conductive the voltage on plate 62 is relatively low. I provide means for continuously increasing the voltage on plate 62 and therefore continuously increasing the amplitude of the output signal from the oscillation generator throughout the range of frequencies established by capacitor 17, said range operating from high frequency to low frequency. Thus as the frequency diminishes and the capacitive reactance of the crystal increases, the amplitude of the oscillation signal correspondingly increases so that the power input into work piece 12 which would otherwise tend to diminish as the frequency decreased is maintained substantially constant over the frequency range. In order to apply a continuously increasing voltage to plate 62 I take off a negative saw-tooth voltage at point 63 from the output of the sweep amplifier and apply the same to the grid 64 of tube 60 to render the same increasingly less conductive as the sweep proceeds. As the tube 60 becomes increasingly less conductive the voltage applied by source 61 to plate 62 correspondingly increases throughout the sweep length and therefore throughout the frequency range, thus continuously increasing the power output of the oscillator and, hence, the power input to the work piece throughout the sweep length (and, hence, throughout the frequency range from high to low frequency).

Another advantage of the above described system is to be found in insuring that the amplitude of the resonant frequency signal will always be greater in magnitude than the second harmonic of the common mode resonance which occurs when intimate contact between the crystal and the work causes them to vibrate as a unit. The spurious signal occurs at a frequency approximately equivalent to one-half the total thickness of crystal and work piece. It frequently occurred that the spurious signal caused by this second harmonic exceeded in magnitude the true signal. However, by this method where more power is delivered to the work piece at the true resonant frequency, the true signal will always exceed in magnitude the spurious signal.

Having described my invention, what I claim and desire to secure by Letters Patent is:

1. In a device for transmitting ultrasonic power into a work piece at its resonant frequency, means including an oscillatory circuit for generating electrical oscillations, said circuit including an oscillator tube having anode, grid and cathode, a source of voltage for the anode, a piezo-electric transducer engaging said work piece and energized by said oscillations for transforming said electrical oscillations into mechanical oscillations, means for varying the frequency of said electrical oscillations through a predetermined range where the capacitive reactance of the transducer increases as the frequency of said oscillations deviates from the natural frequency of the transducer to cause diminution of transfer of ultrasonic power into the work piece, and means for compensating for said diminution of transfer of ultrasonic power into the work piece throughout said range of frequencies, said last-named means comprising an auxiliary tube having anode, grid, and cathode and normally maintained conductive, the anode of the auxiliary tube being connected to the anode of the oscillator tube, means for generating a negative voltage which increases in a negative direction as the frequency of the oscillations decreases, means for synchronizing said voltage generating means with said frequency varying means, and means for applying said negative voltage to the grid of said auxiliary tube to render the auxiliary tube increasingly less conductive to increase the voltage on the anode of the oscillator tube to increase the amplitude of the generated oscillations.

2. In a device for transmitting ultrasonic power into a work piece at its resonant frequency, means including an oscillatory circuit for generating electrical oscillations, said circuit including an oscillator tube having anode, grid and cathode, a source of voltage for the anode, a piezo-electric transducer engaging said work piece and energized by said oscillations for transforming said electrical oscillations into mechanical oscillations, means for varying the frequency of said electrical oscillations through a predetermined range where the reactance of the transducer increases as the frequency of said oscillations deviates from the natural frequency of the transducer to cause diminution of transfer of ultrasonic power into the work piece, an oscilloscope having vertical and horizontal plates, means for applying a voltage across one set of plates to generate a sweep, the other set of plates being connected to the output of the oscillator circuit, means for synchronizing the sweep with the frequency varying means, and means for compensating for said diminution of transfer of ultrasonic power into the work piece throughout said range of frequencies, said last-named means responsive to the sweep voltage to increase the voltage on the plate of said oscillator continuously throughout said frequency range to increase the amplitude of the generated oscillations.

References Cited in the file of this patent

UNITED STATES PATENTS

| Number | Name | Date |
| --- | --- | --- |
| 2,431,234 | Rassweiler et al. | Nov. 18, 1947 |